Figure 6:
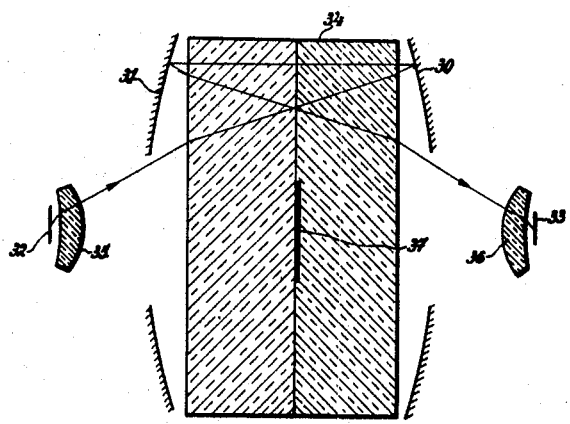

April 5, 1966   A. BOUWERS ET AL   3,244,073
CENTERED OPTICAL MIRROR SYSTEM HAVING FINITE CONJUGATES
Filed Sept. 12, 1962                                   2 Sheets-Sheet 1
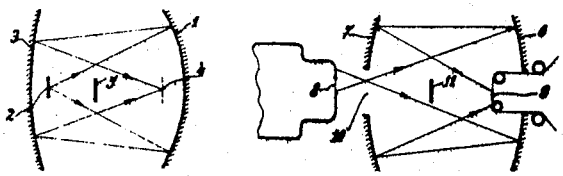
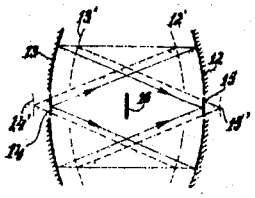
Fig.3
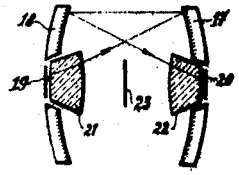
Fig.4
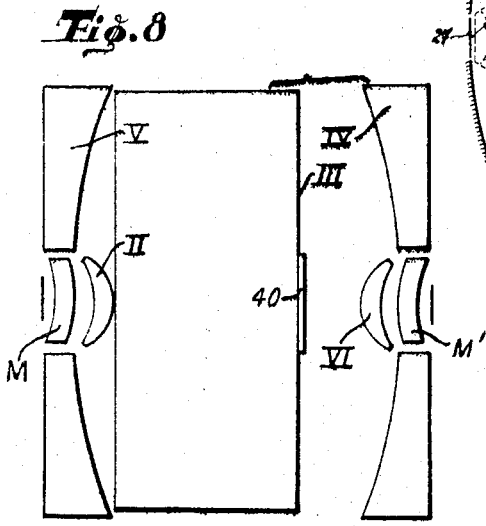
INVENTORS
ALBERT BOUWERS
HENRICUS WILHELMUS BULTHUIS
BY
ATTORNEYS INVENTORS
ALBERT BOUWERS
HENRICUS WILHELMUS BULTHUIS
BY
Dean, Fairbank & Hirsch
ATTORNEYS

United States Patent Office

3,244,073
Patented Apr. 5, 1966

3,244,073
CENTERED OPTICAL MIRROR SYSTEM HAVING
FINITE CONJUGATES
Albert Bouwers and Henricus Wilhelmus Bulthuis, The
Hague, Netherlands, assignors to N.V. Optische Industrie "De Oude Delft," Delft, Netherlands
Filed Sept. 12, 1962, Ser. No. 223,149
Claims priority, application Netherlands, Sept. 19, 1961,
269,391
5 Claims. (Cl. 88—57)

The invention relates to centered optical systems and, more particularly, to systems having finite conjugates and a magnefication between .5 and 2. Such systems may be used to form a real image of a given surface on another surface and vice versa. The two surfaces of which each one is imaged on the other by the optical system will be termed conjugate surfaces hereinafter.

More specifically, the invention relates to systems comprising two concave mirrors which are facing each other and are so positioned relative to each other that light rays departing from a point of a first one of the conjugate surfaces first impinge on a first one of the concave mirrors, then on the other of the concave mirrors and are finally focused in the corresponding point of the other conjugate surface, and in which the conjugate surfaces are lying on either side of a plane intermediate between the concave mirrors.

Systems of this type have become known in various forms. In FIG. 3 of the British patent specification 471,-365 there is shown a system in which the two conjugate surfaces are situated between the two mutually identical mirrors and the light rays departing from one of the conjugate surfaces first impinge on the mirror which is on the same side of the plane intermediate the two mirrors as said one conjugate surface itself. The light rays are collimated by said first mirror and then travel towards the other mirror which is located at a distance from the first mirror greater than twice the focal length of the mirrors.

FIG. 1 of the French patent specification 1,175,200 illustrates a system for unit magnification in which, between the mutually identical concave mirrors, two plane secondary mirrors are provided which are each facing the near-adjacent concave mirror and reflect the divergent or convergent beams travelling between the concave mirrors and the respective conjugate surfaces. With this system the conjugate surfaces in principle may be as well in as outside of the space between the concave mirrors and, in the latter case, central apertures must be provided in the concave mirrors to permit passage of the light rays between the conjugate surfaces and the respective secondary mirrors.

The system described in the British patent specification has a considerable length which in many instances is objectionable, and object and image are in the space between the two concave mirrors at a considerable distance from these mirrors so that they are not easily accessible. Moreover, object and image are, as it were, positioned back-to-back, which sometimes will be impossible. In the system according to the French patent specification 1,175,200 the secondary mirror facing the object will reflect a portion of the light received back to the object which may result in considerable loss of contrast. This effect is especially disadvantageous if the system is used to form an image of self-luminous objects of poor contrast such as the image screen of image converters. Another deficiency consists in that, in this system too, the object and the image receiver must be brought a considerable distance into the space between the two concave mirrors if any substantial luminosity is desired since otherwise the secondary mirrors would have to be made so large as to intercept too much of the light travelling from one mirror to the other.

It is the main object of the present invention to provide a centered optical system of the type referred to which is to a fair degree free from the limitations and drawbacks inherent to the known systems above described. It is a more specific object of the invention to provide a system with two concave mirrors for finite conjugates and a magnification of about unity which is of short over-all length. A further specific object of the invention lies in the provision of such a system which is of simple construction. A still further object is to increase the luminosity of systems of the type referred to. Another object is to provide a system for finite conjugates which does not reflect light back upon the object.

In accordance with the invention, the conjugate surface from which the light rays depart and the concave mirror on which the light rays impinge first are situated on either side of the plane intermediate between the two concave mirrors and means are provided in the space between the concave mirrors to prevent light rays which have not been reflected at the two concave mirrors from being incident on the light receiving conjugate surface.

Thus, in the system of the invention, the light rays will traverse the space between the two concave mirrors, or a substantial part thereof, three times so that the system may be short. Secondary mirrors are absent so that the system is simple in manufacture and adjustment. Furthermore, an increased central obstruction and any loss in contrast which may be caused by such secondary mirrors are effectively avoided.

In a preferred form of the system of the invention the concave mirrors are so positioned that at least one of the conjugate surfaces lies outside of the space between the concave mirrors, between the pole of a first mirror, i.e. the axial point of the mirror surface, and a point at a distance from this miror not exceeding 25% of the focal length of the other mirror, and said first mirror is provided with a central aperture. Such a system is advantageous in that conjugate surfaces which are outside of the mirror system are readily accessible. Yet the system is short and the necessary apertures in the mirrors do not appreciably limit the luminosity of the system.

The concave mirrors may be spherical, as well as elliptic, parabolic or hyperbolic, dependent on the envisaged purpose. If it is desired to form an image of an object having considerable lateral dimensions spherical mirrors will usually be preferred. It will then be desirable to add to the system refractive elements to correct for the spherical aberration of the mirrors. Refractive optical elements which correct for the spherical aberration may be positioned so as to be traversed solely by the divergent or convergent light beams travelling between the conjugate surface and the mirrors opposite such surfaces. Alternatively, they may be positioned in the space between the two mirrors so as to be traversed three times by each of the light rays. In the first mentioned situation the correcting element should be placed outside of the effective light beam travelling from one concave mirror towards the other. Consequently for such elements only little space is available. A correction element which is traversed three times must have a symmetrical influence on both the divergent and the convergent beam, which condition limits the freedom of the designer. A well-known means for correcting the spherical aberration of spherical mirrors as the Schmidt-plate is not suitable for this reason.

According to the invention, the spherical aberration of the system is preferably at least partly corrected by means of a transparant plate having plane parallel or nearly plane parallel surfaces, which plate is positioned between the concave mirrors so as to be traversed three times by the light rays. In order to obtain a good correction at large relative aperture the thickness of the plate is preferably selected to exceed 40% of the mean value of the focal lengths of the spherical concave mirrors.

It may be observed that optical systems have become known in the past which comprise an apertured concave mirror and a plane mirror facing the concave mirror and in which the light rays first pass through the aperture in the concave mirror and are reflected by the plane mirror back towards the concave mirror. Such systems, however, can only be used at a magnification which considerably differs from unity. Furthermore, a somewhat analogous system for unity magnification has become known in which the plane mirror instead of being apertured is semi-transparent so that it transmits one half of the energy of the light rays travelling towards the concave mirror and reflects only one half of the remaining light impinging on it after reflection at the concave mirror. Hence, in this system a large portion of the light is lost.

It is well-known in the optical art that a plane parallel element introduces spherical aberration in a focused beam. As applied in the system of the invention, however, such a plate is used at double effect, viz. once in the divergent beam and once in the convergent beam. Moreover, in this application the plate has the specific advantage that it may be placed at an arbitrary axial position between the concave mirrors, as will be explained hereinafter.

Figure 7:
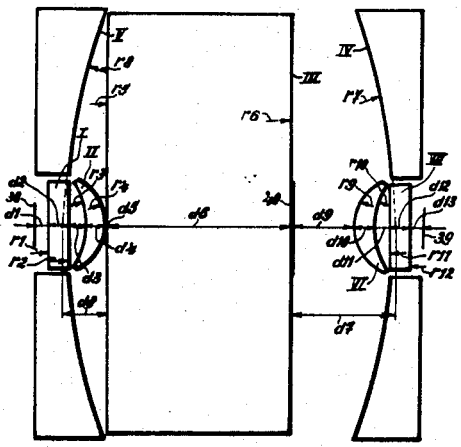

Further objects and features of the invention will appear from the following description of a number of embodiments schematically illustrated in the drawings, in which:

FIG. 1 is a first embodiment of the mirror system according to the invention;

FIG. 2 a second embodiment;

FIG. 3 a third embodiment;

FIG. 4 a fourth embodiment having spherical mirrors and correction lenses;

FIG. 5 a fifth embodiment having a plane parallel correcting plate;

FIG. 6 an embodiment having several correcting elements;

FIG. 7 another embodiment having several correcting lenses;

FIG. 8 is still another embodiment of the invention.

In FIG. 1 a concave elliptic mirror 1 reflects light rays departing from the first or near focus 2 which is the axial point of an object, towards the second or distant focus (not shown) of the ellipse. Opposite the mirror 1 a concave hyperbolic mirror 3 is provided which is axially aligned or centered relative to mirror 1 and whose distant focus coincides with the distant focus of mirror 1. For this reason the rays are focused in the near focal point of the hyperbola which is the axial point of the image surface. Object surface and image surface are located near the mirrors 3 and 1, respectively, so they are on either sides of the plane intermediate between these mirrors and the near focus of each of the mirrors is at the opposite side of the intermediate plane than the respective mirror itself. Thus a large part of the space between the mirrors is effectively used three times by the light rays.

The magnification of the system of FIG. 1 will slightly exceed unity. A light-impervious circular screen 5 is positioned between the object and image to prevent light which has not been reflected by both of the mirrors 1 and 3 from impinging on the image surface.

Systems similar to that of FIG. 1 can be made up of two centered concave parabolic mirrors of equal or slightly different focal lengths depending on whether no magnification, or a slight magnification or minification is desired. An object placed at the focus of one of the mirrors will be imaged at the focus of the other parabola. With all such systems made up of aspherical mirrors an aberration-free image may be formed of the axial point of the object. However, the useful field will be small in either case. Therefore, if the system of the invention has to be used for forming images of appreciable lateral dimensions preferably spherical mirrors will be used.

FIG. 2 shows such a system having two spherical concave mirrors 6 and 7, of which mirror 6 has a radius of curvature which is 1.5 times the radius of mirror 7. An object 8 is placed at the focus of mirror 6, i.e. at a distance from this mirror which is half the radius of curvature. Light rays departing from the axial point of the object 8 are reflected by mirror 6 so as to be practically parallel on their way towards the mirror 7. Since the object 8 is situated outside of the system mirror 7 must have a central aperture 10 permitting the light rays to pass through on their way towards the mirror 6. The object surface is readily accessible because of this position and e.g. the anode screen of an image amplifier tube may be accomodated therein, as is diagrammatically shown in FIG. 2. The image 9 is formed at the focus of mirror 7, i.e. at a distance from this mirror equal to half the radius of curvature of the mirror. The image surface is situated inside the system and in order to feed e.g. a photographic roll film to this surface the film must traverse the useful light beam from aside, or it must be passed over a number of rollers through a hole in the mirror 6, as shown in FIG. 2. Such complications can be avoided by designing the system so that both conjugate surfaces are outside of the system. The light-impervious screen in FIG. 2 is designated 11.

The system of FIG. 2 has a minification which is equal to the ratio of the radii of curvature of the mirrors, viz. 2/3. It is observed that a minification or magnification can also be attained with mirrors of equal radius of curvature by not positioning the object in the focus of mirror 6 but more distant from or nearer to the mirror.

The system of FIG. 3 consists of two spherical concave mirrors 12 and 13 having equal radii of curvature and placed at a mutual distance equal to the focal length of the mirrors. If symmetrically disposed object 14 and image 15 lie at the pole of the mirrors which each have a central aperture, and the magnification is unity. If the mirrors would approach each other still more, as indicated by the dotted lines 12' and 13', the conjugate surfaces would become further separated as indicated at 14' and 15' and would come to lie outside of the mirror system. As will be clear from the path of the light rays shown in dotted lines, in this case the central apertures of the mirrors must be made larger in order to keep the effective aperture of the light beam constant. However, the useful surface of the mirrors is reduced thereby. It is desirable therefore, with systems according to the invention which are to have a high luminosity, to locate the conjugate surfaces not too far outside of the mirror poles in order to avoid limitations due to a too small mirror aperture or light losses due to a too large central obstruction. Preferably, the conjugate surfaces lying outside of the mirrors have a distance from the mirror pole not exceeding .25f, f being the focal length of the mirrors. In FIG. 3 the light-impervious screen 16 again intercepts direct light.

FIG. 4 shows a symmetrical system with two mutually identical spherical mirrors 17 and 18 in which, in order to correct for the spherical aberration of the mirrors, biconvex correction lenses 21 and 22 have been placed in the divergent beam near the object 19 and the convergent beam near the image 20, respectively. These lenses are at the same time active in partly or fully compensating the image field curvature inherent to the mirrors 17 and 18. The correcting lenses 21 and 22 are partly received by the central apertures of the mirrors 17 and 18, respectively. A light-impervious screen 23 prevents the image surface from receiving direct light. Instead of the single lenses 20 and 21 compound correcting elements can be used for the same purpose in the divergent and convergent beams.

It will be clear that on some occasions a certain image curvature as introduced by the concave mirrors may be desirable, e.g. for the reason that the object and/or the image receiving surface themselves are curved. As examples the photocathode of many types of image amplifier tubes or the screen of cathode ray tubes may be mentioned.

In the system of FIG. 5 between the mutually identical spherical mirrors 24 and 25 a thick plate 26 having plane parallel surfaces is provided for the purpose of correcting the spherical aberration of the mirrors. This plate is traversed by both the diverging beam between an object 27 and mirror 24 and the converging beam between mirror 25 and the image surface 28, and has in both instances the same corrective action. On the parallel beams between the two mirrors, on the contrary, which traverse the plate as well, the latter has no influence whatever. The system thus obtained combines a satisfactory spherical correction with a very simple construction and a small length. Yet, the system in this simple form exhibits chromatic errors which make it less suitable for use in non-monochromatic light. Preferably, in systems of large aperture, the thickness of the plate should be selected to exceed 40% of the focal length of the mirrors in order to secure a sufficient correction for spherical aberration. It is possible, however, to select a thickness smaller than that necessary for a satisfactory correction, and have part of the spherical aberration corrected by other plane parallel plates which are traversed solely by the divergent or convergent beams near the conjugate surfaces. Such additional plates are shown in dotted lines in FIG. 5. A certain saving in weight may be attained thereby as the part of the plate 26 to the left of the dotted line can be dispensed with.

In a symmetrical system it is of advantage to dispose the central screen intercepting direct light at the center of the system as in that case the least shadow effect for useful light beams occurs. Therefore, in FIG. 5 plane parallel plate 26 may be positioned intermediate between the mirrors 24 and 25 and divided into two parts of equal thickness which may be cemented together after the screen has been inserted therebetween or may be mounted separately at a small distance from each other. To avoid this complication, however, the most advantageous location of the screen may be approximated by shifting the plate as far as possible towards one of the mirrors, e.g. mirror 25 as shown in FIG. 5, and applying the screen 29 to that surface of the plate which is turned towards the other mirror 24. This asymmetric position of the plate does not affect the state of correction.

A system according to FIG. 5 can have the following data:

| | |
|---|---|
| Relative aperture | 1/0.7 |
| Focal lengths of system halves | 100 |
| Radius of curvature of mirrors 24, 25 | 200 |
| Distance between mirror poles | 124 |
| Distance between conjugate surfaces | 124 |
| Thickness plate 26 | 63 |
| Refractive index ($n_d$) of plate 26 | 1.6034 |

A well corrected system of large relative aperture and for a considerable field angle may be obtained, according to the invention, by adding to the system previously described and including two concave spherical mirrors and a thick plane parallel plate, at least one meniscus-shaped element of positive power which is transversed solely by the light rays on their way between a conjugate surface and a mirror and has its concave side facing the said conjugate surface. A symmetrical system having two such meniscus-shaped elements which in this case are single lenses, is shown in FIG. 6. In this figure the concave mirrors are designated 30 and 31, the plane parallel plate 34, the conjugate surfaces 32, 33, the positive meniscus lenses 35 and 36 and the central screen 37. The meniscus lenses 35, 36 may have a refractive power such that the Petzvalsum of both system-halves is approximately zero or has a certain desired value, whereby the image curvature will be compensated or adjusted to a desired degree. The meniscus lenses are at the same time active in correcting astigmatism and the longitudinal chromatic aberration introduced by the plane parallel plate.

The data of the example shown in FIG. 6 are as follows:

| | |
|---|---|
| Relative aperture | 1/0.7. |
| Focal length of system halves | 100. |
| Radius of curvature of mirrors 30 and 31 | 236.15. |
| Thickness plate 34 | 82.85. |
| Refractive index ($n_d$) and Abbe number ($\nu$) of plate 34 | 1.6034; 38. |
| Radii of curvature of lenses 35 and 36 | 82.86; 27.62. |
| Refractive index ($n_d$) and Abbe number ($\nu$) of lenses 35, 36 | 1.540; 56. |
| Thickness of lenses 35, 36 | 8.47. |
| Distance between lenses 35, 36 and conjugate surfaces | 3.315. |
| Distance mirror pole to conjugate surface opposite thereto | 150.38. |

The mutual distances of the mirror poles and of the conjugate surfaces are not mentioned in the above table. In analogy to FIG. 3, these distances may be varied between wide limits without deteriorating the state of correction. This holds too, of course, for the system of FIGS. 4 and 5, and for that of FIG. 7 later to be described, in all of which there is a parallel light beam between the two concave mirrors. The screen 37 in FIG. 6 is applied to a cemented surface dividing the plate 34 into two halves.

The correction can still be improved by adding between a conjugate surface and the positive meniscus-shaped element associated therewith, a plane parallel plate as shown in FIG. 7 or a meniscus lens M, as shown in FIG. 8, having no or only a small power. This plane parallel plate or powerless or weak meniscus lens provides the possibility to correct for a remainder of spherical aberration, if any, and to improve chromatic correction, advantage being derived from the fact that the additional element is positioned in a beam which is more divergent or convergent than the beams traversing the large plane parallel plate due to the interstition of the positive meniscus lens. Moreover, in the case where the additional element is a meniscus lens too, astigmatism may favorably be acted upon thereby.

The embodiment shown in FIG. 8 is substantially the same as the embodiment shown in FIG. 7 except that instead of the plane parallel plate I, VII, of FIG. 7, a meniscus lens M, M' having only a small power is provided. As the operation of the embodiment shown in FIG. 8 is substantially the same as that of FIG. 7, it will not be described.

An example of the system thus obtained and having unity magnification is shown in FIG. 7. The system is very luminous and is corrected for spherical and chromatic aberration, astigmatism and image curvature in a considerable field. The system has the data gathered in the following table; the meaning of the several indications used therein may be collected from FIG. 7.

Focal length of system halves, f=100
Relative aperture, 1/0.7

| Element | Radius of curvature, r | Axial distance or thickness, d | Refractive index, $n_d$ | Abbe number, $\nu$ |
|---|---|---|---|---|
| Object 38 | | $d_1 = 5.48$ | | |
| Lens I | $r_1 = \infty$ | | | |
| | | $d_2 = 10.40$ | $n_{d_1} = 1.503$ | $\nu_1 = 51.0$ |
| | $r_2 = \infty$ | | | |
| | | $d_3 = 6.58$ | | |
| | $r_3 = 55.04$ | | | |
| Lens II | | $d_4 = 11.00$ | $n_{d_2} = 1.540$ | $\nu_2 = 56.0$ |
| | $r_4 = 27.52$ | | | |
| | | $d_5 = 0.76$ | | |
| | $r_5 = \infty$ | | | |
| Lens III | | $d_6 = 93.33$ | $n_{d_3} = 1.603$ | $\nu_3 = 38.0$ |
| | $r_6 = \infty$ | | | |
| | | $d_7 = 53.08$ | | |
| Mirror IV | $r_7 = 308.94$ | | | |
| | | $d_8 = 23.87$ | | |
| Mirror V | $r_8 = 308.94$ | | | |
| | | $d_9 = 29.97$ | | |
| | $r_9 = 27.52$ | | | |
| Lens VI | | $d_{10} = 11.00$ | $n_{d_4} = 1.540$ | $\nu_4 = 56.0$ |
| | $r_{10} = 55.04$ | | | |
| | | $d_{11} = 6.58$ | | |
| | $r_{11} = \infty$ | | | |
| Lens VII | | $d_{12} = 10.40$ | $n_{d_5} = 1.503$ | $\nu_5 = 51.0$ |
| | $r_{12} = \infty$ | | | |
| Image 39 | | $d_{13} = 5.48$ | | |

The plane parallel plate III in the system of FIG. 7 is placed as close as possible to the mirror V in order to reduce the obstruction caused by the central screen 40.

The invention is not limited to the examples shown and described, many details of which may be subject to variations. Special attention may be drawn to the possibility to correct a system as illustrated in FIG. 5 for chromatism by providing interfaces in the smaller plane parallel plates shown in dotted lines, which interfaces are concave towards the associated conjugate surface. In FIG. 5 one such cemented surface is diagrammatically shown in the left plate. For the two parts of the plate glass types are used which differ in dispersion but have equal refractive indices for the mean wave length so as to leave undisturbed the state of monochromatic correction. In the numerical example given for FIG. 5 these plates may have the following data:

Thickness of positive part _____ 7.
Glass of positive part _____ $n_d = 1.603$; $\nu = 38$.
Thickness of negative part _____ 3.
Glass of negative part _____ $n_d = 1.603$; $\nu = 58$.
Radius of curvature of interface _____ $r = 42.15$.
Distance of plate to conjugate surface _ 37.75.

The thickness of the large plane parallel plate which is traversed three times in this case becomes 53.

We claim:

1. A centered optical objective system having finite conjugates and a magnification between .5 and 2, which system comprises two concave spherical mirrors facing each other and so positioned with respect to a pair of conjugate surfaces that such conjugate surfaces are on opposite sides of the plane midway between said concave mirrors and the light rays departing from a first one of said conjugate surfaces first impinge on the concave mirror which is on the side of said plane opposite to said first one of said conjugate surfaces, then impinge on the other concave mirror and are finally focused in the other of said conjugate surfaces, said system further comprising baffle means positioned in the space between said concave mirrors to prevent light rays which have not been reflected by the two concave mirrors from being incident on said other of said conjugate surfaces, and a spherical aberration correcting plate having substantially plane parallel surfaces and a thickness exceeding 40% of the mean value of the focal lengths of said concave mirrors, said plate being disposed between and air-spaced from said concave mirrors so as to have each of its plane parallel surfaces traversed three times by the light rays.

2. An optical system as claimed in claim 1, wherein said plate is positioned so as to be at a distance from one of the concave mirrors different from the distance to the other concave mirror, said baffle means being a light-impervious screen applied against that outer surface of the plate which has the largest distance from the concave mirror opposite thereto and covering a central portion of said surface of said plate.

3. An optical system as claimed in claim 1, wherein at least one side of said plate a meniscus-shaped element of positive refractive power is added which is traversed solely by the light rays travelling between said plate and the conjugate surface which is on the same side of said plate as said element, said element turning its convex side towards said plate.

4. An optical system as claimed in claim 3 wherein on the side of said meniscus-shaped element remote from said plate a further plate with plane parallel surfaces is added which is solely traversed by the light rays which also traverse said element.

5. An optical system as claimed in claim 3, wherein on the side of said meniscus-shaped element remote from said plate a substantially powerless meniscus-lens is added which is solely traversed by the light rays also traversing said element.

References Cited by the Examiner

UNITED STATES PATENTS 2,031,792  2/1936  Richter _____ 88—57
2,212,211  8/1940  Pfund.
2,628,533  2/1953  Oetjen _____ 88—57
2,682,197  6/1954  Davis _____ 88—57

FOREIGN PATENTS 410,262  3/1910  France.
747,917  10/1944  Germany.
471,365  9/1937  Great Britain.
609,615  10/1948  Great Britain.
656,011  8/1951  Great Britain.

OTHER REFERENCES

Greenler: Reflection Image Reducer, article in Journal of the Optical Society of America, volume 46, No. 6, June, 1956, pages 433 and 434.

JEWELL H. PEDERSEN, *Primary Examiner.*